Dec. 29, 1942.  E. E. WEMP  2,307,006
FRICTION MEMBER FOR CLUTCH AND BRAKE
Filed Feb. 18, 1938  4 Sheets-Sheet 1

INVENTOR.
Ernest E. Wemp
BY
Barnes, Kisselle, Laughlin & Raisch
ATTORNEYS

Dec. 29, 1942.   E. E. WEMP   2,307,006
FRICTION MEMBER FOR CLUTCH AND BRAKE
Filed Feb. 18, 1938   4 Sheets-Sheet 3

INVENTOR.
Ernest E. Wemp
BY
Barnes, Kisselle, Laughlin & Raisch
ATTORNEYS

Dec. 29, 1942.　　　　E. E. WEMP　　　　2,307,006
FRICTION MEMBER FOR CLUTCH AND BRAKE
Filed Feb. 18, 1938　　　4 Sheets-Sheet 4

INVENTOR.
Ernest E. Wemp
BY
Barnes, Kisselle, Laughlin & Raisch
ATTORNEY.S

Patented Dec. 29, 1942

2,307,006

UNITED STATES PATENT OFFICE 2,307,006

FRICTION MEMBER FOR CLUTCH AND BRAKE

Ernest E. Wemp, Detroit, Mich.

Application February 18, 1938, Serial No. 191,145

11 Claims. (Cl. 192—107)

This invention relates to friction members for brakes or clutches, and it has to do particularly with a construction of a disc such as may be used as a clutch driven member or a friction member of a brake.

This application is a continuation in part of application Serial No. 173,332, filed November 8, 1937, and now abandoned.

The invention is directed particularly to the provision of an improved disc for use with clutches for transmitting power from internal combustion engines, and particularly, in automotive vehicles and for use as a friction member in disc type brakes. The disc of this invention is one designed to be packed between clutch driving members or disc brake members and the disc is arranged so that it is capable of compression in order to facilitate a smooth and gradual clutch and brake engagement, and a general nicety of clutch and brake action.

There are a number of objects to the invention, among which, so far as clutches are concerned, are the following: The provision of a clutch disc structure which has the characteristic of being yieldably compressible and which has portions which yield or flex in such compressing action, but which is constructed from a relatively few parts, thus facilitating manufacture and assembly and reducing manufacturing costs. More specifically, a clutch disc with these characteristics is provided without the use of separate cushion or spring means for permitting the yielding action. The clutch disc is arranged to have yielding elements which resist the compressing action, and these elements are incorporated directly in the material which forms the body of the disc.

In the production of such a disc it is often desirable that the disc have a deflection curve which is relatively flat in the initial stages of the compression. However, the material which forms the body of the disc must be strong enough to transmit the engine torque and this necessary strength has been a factor in requiring, heretofore, the use of light spring elements to obtain the desired yield or resilience. In accordance with the present invention, however, an arrangement is provided where the desired characteristics can be obtained by the metal of the disc body. To this end, the disc body is so constructed that the deflection curve is provided by two actions; one action is that of a torsion or twisting of some portions of the disc body, and the other is that of a bending action. The initial stages of clutch engagement may cause a torsion or twisting action on some of the portions of the disc body, and this gives the deflection curve a fairly flat form in the initial stages of engagement. Subsequent to the torsion action, the bending action takes place and the deflection curve then rises more sharply. The torsion action and bending action merge into each other so that the curve presents no abrupt indication as to where the torsion and the bending action combine. Different vehicles require different clutching actions and deflection curves, and very often changes made in a model or vehicle are such as to require different clutch actions and deflection curves. The clutch of this invention is admirably suited for the tailoring, so to speak, of the clutch to different vehicles, or different models of the same vehicle. The same general disc construction may be used to obtain various deflection curves and the variation in the deflection curves may be obtained by varying the relationship of the torsion and bending actions. The deflection obtained by the torsion action alone may be varied by a simple expedient while employing essentially the same structural disc, and the deflection obtained by the bending action may be similarly varied by the same expedient.

Generally, the efficiency of a clutch disc can be figured by the rate of deflection and the wear pattern. As above pointed out the rate of deflection may be varied by varying the torsion and bending actions. This invention also provides a clutch disc which provides an efficient wear pattern in that the facings are supported substantially entirely across their faces from the inner to the outer edges, and the facings are supported at a large number of places throughout their circumferential extent. It will be understood that a wear pattern is indicated by the locations on a clutch facing which are resiliently supported and which take the initial clutch engaging action. Similar results and advantages are obtained in brakes. These and other objects will become more apparent as the detailed description progresses.

Figure 3:
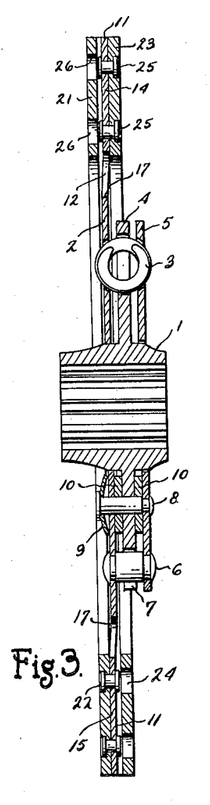
Fig. 3 is a cross sectional view taken through the disc substantially on line 3—3 of Fig. 1.

The clutch member as shown herein is in the form of a driven disc or member for a friction clutch having a hub 1 arranged to be splined on to a driven shaft, and a disc body member 2. The disc and hub may be connected by a vibration dampening arrangement in the form of an annulus of coil springs 3 located in aligned openings in the disc 2, flange 4 of the hub and a washer 5. The washer 5 is connected by rivets 6 to the disc 2 so as to operate in unison therewith, the washers passing through clearance notches 7 in the flange of the hub. Rivets 8, each with a spring washer 9 at one end, pass through the members as illustrated in Fig. 3, and friction material 10 is disposed between the disc and hub flange and between the washer and hub flange. Driving forces are transmitted from the disc to the hub and vice versa through the coil springs, and when they flex there is a spring loaded friction action afforded by the friction material 10. This is just one form of construction which may be embodied in the member between the disc body and hub and this construction is substantially that as shown in Patent No. 2,042,570 of June 2, 1936.

Figures 1, 2, 4:
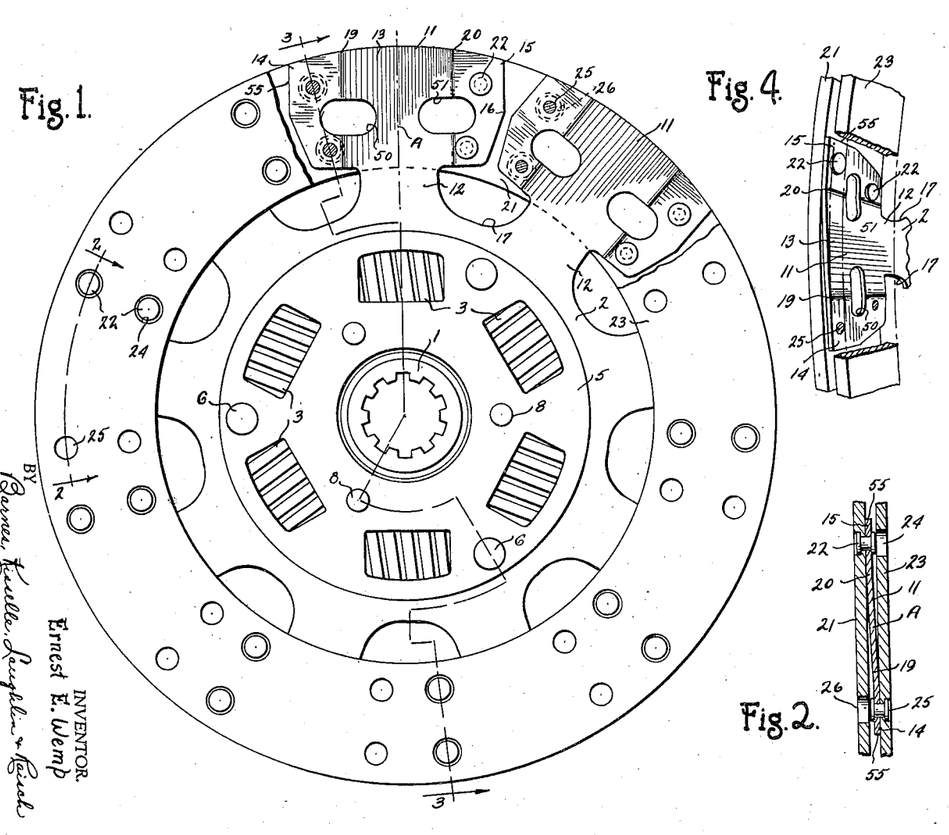
Fig. 1 is a view of a clutch disc constructed in accordance with the invention with some of the facing cut away illustrating underlying disc structure.
Fig. 2 is a sectional view taken substantially on line 2—2 of Fig. 1.
Fig. 4 is a perspective view with part of one facing cut away illustrating the disc structure.

The disc body advantageously is of spoke construction, particularly in its outer zone. As illustrated in Fig. 1, the spokes are generally illustrated at 11, and each having a neck 12 and an enlarged head. The head, as illustrated, may be visualized as having three portions, namely, a center portion 13, and lands 14 and 15 on opposite sides thereof. A spoke of this formation is provided by slotting the disc as at 16 and providing the slots with enlarged portions or openings 17.

Each spoke has a twisted formation with the twist formation being substantial centralized on a radial line running through the center of the portion 13 of the spoke. This center line is generally illustrated at A in Figs. 1 and 2. At the line A this portion of the spoke is substantially in the plane of the body of the disc and the center portion 13 is inclined so that it extends to opposite sides of the center plane. Between the center portion and each land is a bend line illustrated at 19 and 20, so that the lands 14 and 15 are substantially positioned in planes parallel to the plane of the disc but axially removed to opposite sides thereof. In the actual formation of the spokes the bend lines do not appear to be abrupt, although theoretically the bend lines occur substantially on the lines 19 and 20. The actual appearance is a good deal like the illustration shown in Fig. 2. The shading in Figs. 1 and 2 is slightly exaggerated to demonstrate the formation.

Two facing members are secured to the disc, one on one side and one on the other. The facing member 21 is secured to the lands 15, as for example, by rivets 22. It will be understood that each spoke is formed like the one just described, so that all of the lands 15 project to the same side of the center plane of the disc and are in a position to be secured to the facing 21. The facing 23 may be provided with clearance openings 24 for the heads of the rivets 22 and is secured by rivets 25 to the lands 14, the facing 21 being provided with clearance apertures 26 for the rivets 25.

It will be observed that with this construction the facings are normally held in axially spaced relation, but they are capable of moving toward each other as the disc is collapsed or compressed incident to being packed between clutch driving members. In initial clutch engagement, force is transmitted to the lands 15 from the left as Fig. 2 is viewed, and this is resisted by a like force transmitted to the lands 14 from the right. This causes a twisting or torsion action on each spoke substantially around its center line. As this is continued the extreme edge portions of the lands 14 and 15 will come into contact respectively with the facings 21 and 23. The bend line 20, however, is at this time spaced from the facing 23, and the bend line 19 is spaced from the facing 21. Continued addition of clutch pressure now tends to bend the metal, the tendency being to straighten the bends 19 and 20, and ultimately, if sufficient pressure is applied, these bent portions will be straightened out. During the bending action the spokes are also twisted so that the compression is resisted by bending and torsion. It is not essential, however, that sufficient pressure be added to completely straighten out the bend formations.

Figure 5:
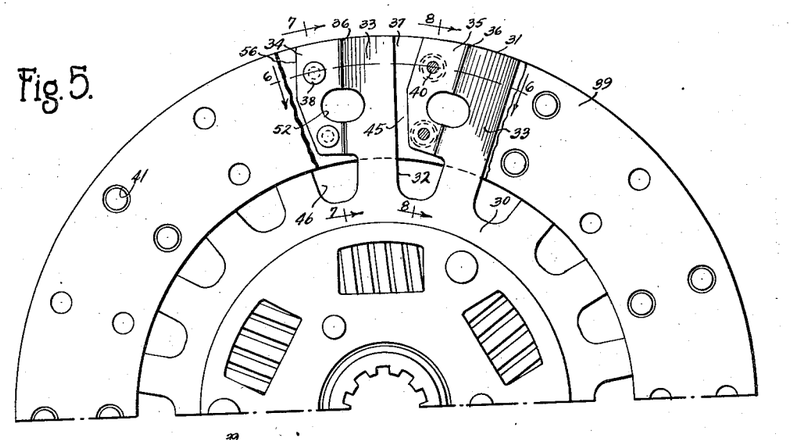
Fig. 5 is an elevational view of a modified form of construction with some of the facing cut away illustrating underlying disc structure.
Figure 6:
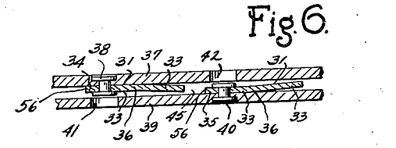
Fig. 6 is a cross sectional view taken substantially on line 6—6 of Fig. 5.
Figure 7:
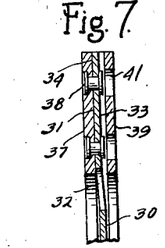
Fig. 7 is a cross sectional view taken substantially on line 7—7 of Fig. 5.
Figure 8:
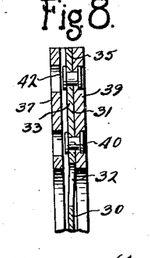
Fig. 8 is a cross sectional view taken substantially on line 8—8 of Fig. 5.
Figure 9:
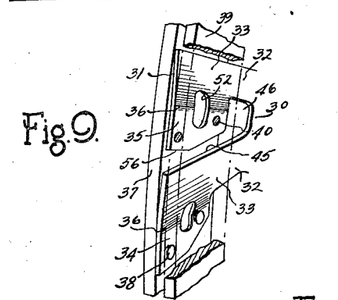
Fig. 9 is a perspective view with one facing cut away and illustrating the disc structure.

In the form shown in Fig. 5 each spoke has but a single land. In this form the hub and associated parts have the same reference characters applied as are used in the form shown in Figs. 1 to 4. The disc body is illustrated at 30, while the spokes are generally illustrated at 31. Each spoke has a neck portion 32, which connects into a body portion 33 on one side of which is a wing or land. Alternate spokes have wings or lands 34 while the intervening spokes have wings or lands 35. The body portion 33 of alternate spokes are twisted or are angularly disposed so that the lands 34 are positioned on one side of the center plane as illustrated in Fig. 6, and the lands 35 on the opposite side. The lands join to the body portions of spokes substantially on bend lines 36 which, however, may not be abrupt, as illustrated in Fig. 6, so that the lands substantially parallel the plane of the disc. The facing 37 on one side is secured to the lands 34 by rivets 38 and the facing 39 on the opposite side is secured to the lands 35 by rivets 40, the facings having clearance holes 41 and 42 for accommodating the rivets. The edge of the spokes 31 opposite the edge of the lands lies substantially in the plane of the disc. The spokes are separated by cut-out portions 45, which are preferably enlarged as at 46 to obtain the desired dimensions of the necks 32.

In this form the initial action which takes place as the clutch begins to engage is a torsion action on the spokes, twisting them toward a position of alignment in the plane of the disc. In other words, considering Fig. 6, the pressure on the facing 37 twists alternate spokes, tending to force the lands 34 into the plane of the disc, and the reacting pressure on facing 39 twists alternate spokes tending to urge lands 35 into the plane of the disc. Ultimately, the extreme opposite edges of alternate spokes will come into contact with the facings, with the bend formation presenting arch-like formations between the facings, and as the packing pressure of the clutch is increased the tendency is to bend the metal, thus tending to straighten out the bend formations.

In designing the clutch disc the resistance offered by the torsion action may be varied by varying the dimensions of the necks 12 and 32. In the form shown in Fig. 1 the initial clutch engagement exerts twisting or torsion action on the necks 12; and by varying the length, width and thickness of the necks, the resistance to this torsion action may be governed as desired. The necks can be varied as to length and width by changing the shape of the cut-out openings 17, and as to thickness by selecting clutch disc stock. In the form shown in Fig. 5, the necks 32 may be varied as to length and width by the shape of the cut-outs 46, and, of course, by variation in the thickness of the stock. In the form shown in Fig. 1 the necks 12 are of considerably more width than the necks 32 in Fig. 5, and because the necks 12 are twisted by forces from two lands on opposite sides of the center line, whereas the necks 32 are twisted only by one land. In some instances it may be desirable to form the necks so that opposite edges thereof are parallel substantially as illustrated in Fig. 5, and in this way there is a substantially equal distribution of stresses in the twisting of the necks. In Fig. 1 opposite edges of the necks 12 are substantially parallel for a short distance, and then terminate on radii, but opposite edges of the neck have the same formation.

The form shown in Fig. 1 has some advantages over that shown in Fig. 5. Each spoke is twisted by equal forces delivered to opposite lands; therefore, the tendency to shift the spoke bodily out of the plane of the disc is substantially eliminated; whereas in the form shown in Fig. 5 the body of the spoke is called upon to resist forces delivered to it from one side until such time as the facings come close enough together so that opposite edges of a spoke are in contact with one facing. Moreover, any tendency of the facings to expand or contract, due to heat variations, are balanced out in a better manner in the form shown in Fig. 1, as each spoke is connected to a facing on opposite sides thereof; whereas in Fig. 5 each spoke is connected only to one facing. Notwithstanding these advantages which the Fig. 1 construction has over the Fig. 5 construction, the Fig. 5 construction is nevertheless a perfectly practical type of structure capable of operating in accordance with the invention.

It will also be observed that in both forms of the invention the spokes have apertures formed therein. In Fig. 1 each spoke has two apertures, at 50 and 51, located substantially in the bend formation, while the spokes shown in Fig. 5 each are apertured as at 52. The location of these apertures may be varied by shifting them radially inwardly or outwardly and by so doing the strength of the beams on opposite sides of the apertures may be governed. The term "beam" is applied to those portions of the spokes which engage both facings and hold the facings yieldingly spaced apart by resistance to bending. In Fig. 1, that part of the body portion 13 on one side of the center line and land 14, and that part of the body portion 13 on the opposite side of the center line and land 15, all lying radially outwardly of the openings 50 and 51 may be termed "beams." The term "beam" is also applied to similar portions lying radially inwardly of the openings. The distance between the center line of spoke 11 and the far edge of the land 14, measured adjacent the outer periphery of the disc, is greater than the distance between the center line of the spoke and the far edge of the wing 14 measured adjacent the neck 12. The same thing is true as to the wing 15, and the same thing is true as to each spoke in the form shown in Fig. 5. The apertures 50, 51 and 52, as shown, are located so as to give the outer beam more width than the inner beam, thus to increase its strength substantially proportional to its increased length. With the apertures positioned and formed substantially as shown, the force required to collapse the beams is about the same. If the apertures are shifted radially outwardly, the outer beams will be weakened and the inner strengthened; if the apertures are shifted relatively inwardly, the inner beams will be weakened and the outer strengthened. In this manner the desired strength of the beams can be obtained. Moreover, since the tendency is for the beams to increase in length with increase in diameter, the spokes in Fig. 1 may be cut off as illustrated at 55 so that the outer beams are kept from being too long, and the spokes shown in Fig. 5 may be cut off as illustrated at 56 for the same purpose.

Figure 10:
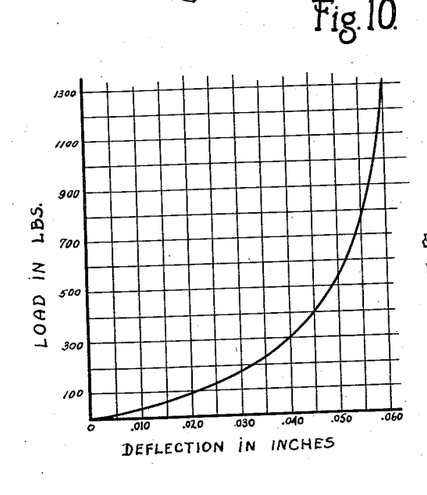
Fig. 10 illustrates a deflection curve obtained with the disc constructed in accordance with this invention.

In a cushion clutch disc of this type it is desirable, as above pointed out, that initial compression takes place against a relatively low resistance but wherein the resistance increases as the compression of the disc continues. A curve plotted to show this desired characteristic is one which is fairly flat in the early stages of clutch engagement and such a curve is illustrated in Fig. 10, this curve being plotted from a disc constructed in accordance with Fig. 5. Here it will be noted that the curve is fairly flat initially, and in fact a load of about 300 lbs. causes a deflection of about .040 of an inch. At about 1300 lbs. of load, the deflection has increased to .060 of an inch, it being apparent that the final thousand lbs. of load increased the deflection only about .020 of an inch. The present construction accomplishes this result in an admirable fashion because in initial clutch engagement the deflection is caused by twisting of the spokes as the facings shift toward each other. Ultimately the spokes of bend formation will be packed between the facings and then upon the application of increased clutch pressure the tendency is to straighten out the spokes. The initial torsion and the final bending merge into each other to form such a curve as is plotted in Fig. 10. A total deflection of about .060 of an inch as shown in Fig. 10, is about the maximum deflection desired, and in fact in many instances the clutch will be constructed to give a total deflection of less than .060 of an inch, although the curve shown illustrates the point in mind.

Figure 11:
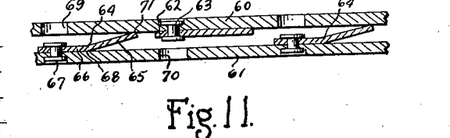
Fig. 11 is a view similar to Fig. 6 illustrating another modified form.

In the form illustrated in Fig. 11, one facing is illustrated at 60 and another at 61. Instead of each spoke having portions lying normally out of the center plane of the disc, only some of the spokes are thus formed, as for example, alternate spokes, as illustrated. One facing such as the facing 60 is secured to spokes 62 as by means of rivets 63, and the spokes 62 lie in the plane of the disc. Alternate spokes 64 have angular portions 65 and lands 66, preferably parallel to the plane of the disc. The facing 61 is secured to the lands as by means of rivets 67. The lands 66 and angular portion 65 merge together substantially on bend lines 68. Each facing may have clearance apertures for the rivets of the other as illustrated at 69 and 70. In this form the lands 66 may be off-set relative to the center plane of the disc twice the amount of the off-set of the lands 35 and 34 of the Fig. 5 form, and the lands 14 and 15 of the Fig. 1 form, so that the normal spacing between the facings 60 and 61 is the same as the normal spacing between the facings of the other forms.

The spokes 64 take care of all of the deflection. In the first action of clutch engagement the portions 65 are twisted and then when the facings are brought close enough together so that the spokes 64 act as bridges, they are flattened by the bending action along the bend lines 68. This structure also has an advantage in that the edges of the spokes 64, as indicated at 71, engage across the facing 60. When pressure is applied to the lands 66 the cantilever action tending to bend the spokes laterally of the plane of the disc is resisted by the contact at 71. The shape and dimensions of these spokes may be designed to give the required engagement curve as above discussed in connection with the other forms. The spokes 64 in this form may be shaped substantially like the spokes 33 in Fig. 5, that is with an extension on one side forming an enlargement, but the spokes at 62 may or may not have enlarged heads.

Figure 12:
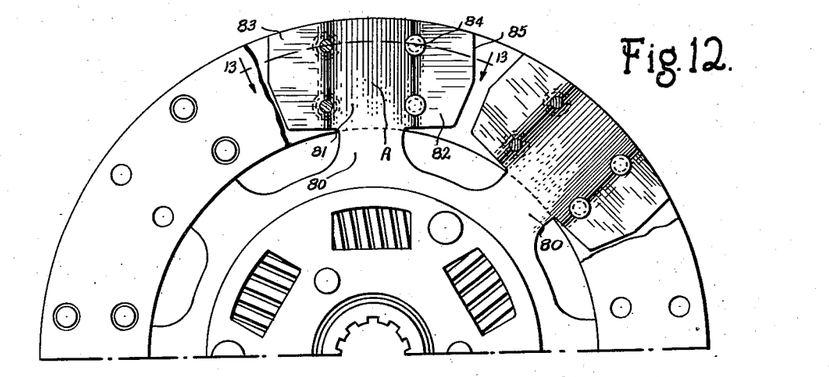
Fig. 12 is a view of another form of the invention.
Figures 13, 14, 15:
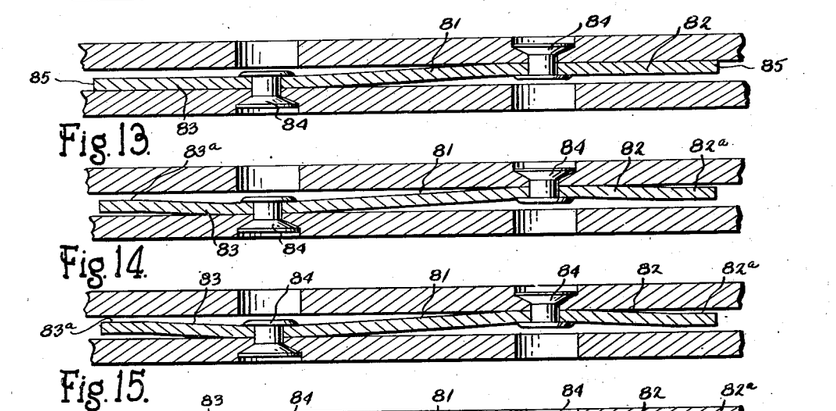
Fig. 13 is a sectional view taken substantially on line 13—13 of Fig. 12 illustrating the spoke formation.
Figs. 14 to 18, inclusive, are sectional views similar to Fig. 13 illustrating different formations which may be given to the spokes and heads for obtaining different deflection curves.

In Fig. 12 the disc is formed with spokes having a neck portion 80 and heads each with a central portion 81 and lands or wings 82 and 83. In this form the center portion 81 is angularly disposed as shown in Fig. 13 and the lands or wings 82 and 83 are offset to opposite sides of the plane of the disc. The facings are secured by rivets 84. In this form the radially inward rivets are the same distance from the center line A as the radially outward rivets, with the result that the length of the effective lever from the center line to each rivet is substantially the same. Moreover, the rivets are located preferably at the high points or crest adjacent the bent line or line of connection between the wings and the central portion.

Now as this clutch is engaged the facings approach each other (Fig. 13) twisting the central portion and neck 80 of the spoke. Ultimately the extreme ends contact the opposite facings and then there is a bending action tending to straighten out the spoke head. The force for the torsion action is applied to the spoke head substantially on parallel lines through the rivets and the leverage is the same for the outer rivets and the inner rivets. The rivets, rather than being on radial lines, are parallel. Thus the resistance offered by torsion adjacent the outer periphery of the facings is substantially the same as the resistance offered adjacent the inner periphery of the facings.

Figure 19:
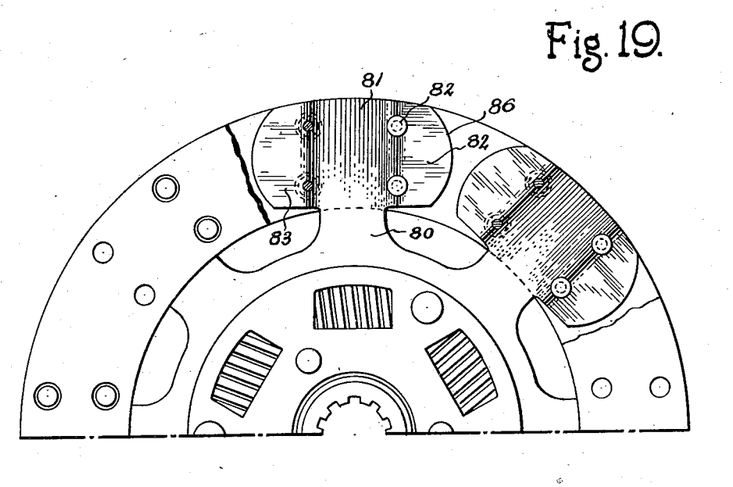
Fig. 19 is a view of a still different form of the invention.

Preferably each spoke head is formed so that its width measured circumferentially in its outer zone is not much greater than its width in its inner zone. Therefore, when the edges come into contact with the opposite facings for bending the head, the resistance to bending is substantially uniform across the width of the facings. This is accomplished by cutting off the ends of the spoke heads as illustrated at 85, although in the form shown in Fig. 12, the outward portion may be slightly longer than the inner portion. However, with the heads shaped as shown in Fig. 19, the distances across the head at its inner and outer portions are precisely the same. In this form the ends of the heads are rounded, as illustrated at 86. In this form reference characters are used which are otherwise the same as those used in connection with Fig. 12.

The torsion action may be regulated or controlled by varying the length and width of the necks. In the form shown in Figs. 12 and 19 no apertures are provided corresponding to the apertures 50 and 52 of the previously described forms. However, apertures may be provided in this form if it is found to be necessary or desirable to use apertures in order to control the resistance to the bending action.

In all of the forms a good wear pattern on the facings is provided because of the many points of support given to the facings and because the supports extend substantially completely across the facings from the inner to the outer peripheral edges. The clutch disc shown in Fig. 1 has nine spokes and the clutch discs shown in Figs. 12 and 19 have eight spokes. This gives respectively nine and eight initial supporting lands for each facing with the supports alternating on the facings and the supports extending substantially completely across the facings. In Fig. 5 where there may be eighteen spokes, for example, there are nine initial supports for each facing. The spoke heads of all forms act as units or in their entirety as differentiated from struck-out tongues or portions, and this contributes to the obtaining of a satisfactory wear pattern. As the spokes twist the entire head portions function on the facings. As the spokes bend the entire head portions bend. In this manner there are no localized points or spots which initially support the facings and which would be designed to give a bad wear pattern.

Figures 16, 17, 18:
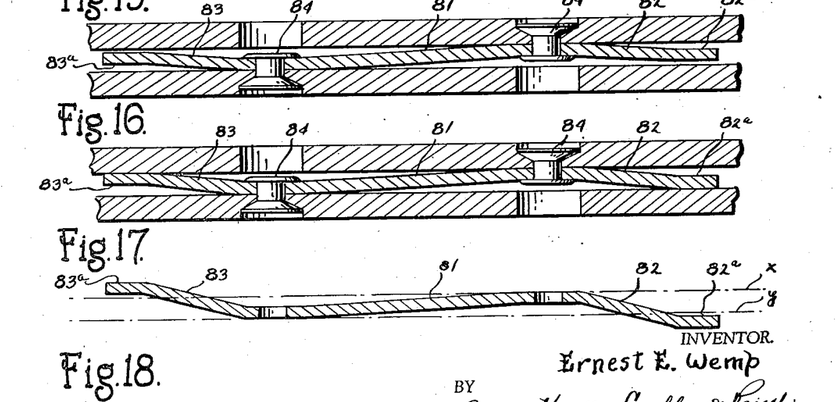

All of the various forms of the discs may be varied or modified to obtain different deflection curves in order that the most satisfactory clutch disc may be selected for a particular vehicle or model of that vehicle. This variation in structure is illustrated in Figs. 13 to 18, inclusive, and while Fig. 13 is a sectional view taken through the form shown in Fig. 12, the same principle applies to all forms. In Fig. 13 the lands or wings 83 are located flush against the facings. Therefore, there will be only a torsion action until the central part of the spoke and the neck are twisted far enough to bring the extreme edges of the wings 82 and 83 into engagement with the opposite facing and then there will be a bending action. In Fig. 14 the wings are fashioned so as to extend toward the center line of the disc about one-fourth of the distance. Therefore, the deflection by torsion alone will not be so great and the bending action will start at a lower point on the deflection curve. In Fig. 15 the wings or lands are fashioned to extend substantially to the center line. This further reduces the amount of deflection obtained by torsion alone and advances the bending action to a lower point on the deflection curve. In these forms the extreme ends of wings or lands may be flattened into planes substantially paralleling the plane of the disc, as illustrated at 82a and 83a. The bend lines for the tips 82a and 83a extend substantially parallel with each other across the spoke head and all portions of each bend line are substantially equidistant from the center line through the spoke. Therefore, the resistance to bending is substantially uniform across the facings. In Fig. 16 the wings are extending beyond the plane of the disc and substantially three-fourths of the way across the distance between the facings. The deflection obtained by torsion action alone in this form will therefore be only about one-fourth of the total possible deflection, and then the bending action will begin. In these and all other previously described forms, the torsion action alone functions until the bending begins, and then further compression takes place by both torsion and bending, and in this sense there is an overlapping of the torsion and bending actions. In Fig. 17 and wings 18 are fashioned to extend completely across the distance between the facings. Therefore, in this form initial deflection and all deflection takes place with the torsion and bending actions functioning simultaneously. In Fig. 18 the initial shape of the head is illustrated before the facings are attached, and the normal inner surfaces of the facings are illustrated by the lines X and Y. It will be noted that the wings or lands are extended beyond the opposite crest or bend line. Therefore, when the facings are attached the heads are flexed and preloaded. When the facings are attached the structure will appear substantially as shown in Fig. 5, except that the head is preloaded, whereas in Fig. 5 the spoke head is not preloaded. The preloading gives a stiffer action and a more abrupt deflection curve.

Figure 20:
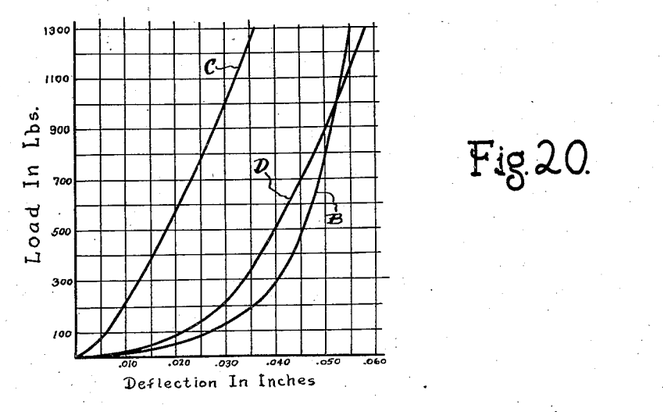
Fig. 20 is a view illustrating examples of deflection curves which may be obtained by the different formations.

If a deflection curve is desired which is very flat in its earlier stages, the form shown in Fig. 13 or Figs. 1, 5 and 11 may be used. Such a deflection curve is illustrated in Fig. 10 and also by the curve B in Fig. 20. If a little stiffer action is needed where the curve is not so flat in its lower portion, the form shown in Fig. 14 may be used. Different deflection curves may be selected in progression through all the Figs. 13 to 18, inclusive, and the curve C in Fig. 20 is illustrative of a fairly abrupt curve with a stiff action such as may be obtained with the structures shown in Fig. 17 or Fig. 18. These curves are not designed to show precisely the correct curve but are illustrative of extreme curves. By selecting any one of the forms shown in Figs. 13 to 18, inclusive, any desired curve between the curves B and C may be obtained. For example, a curve such as curve D in Fig. 20 may be obtained by selecting a clutch disc of a form intermediate the forms shown in Figs. 13 to 18, inclusive. It is not essential that each clutch disc completely collapses at full engagement as indicated by the curves B, C and D. In some cases the curves may cross as indicated by curves B and D. Various ancillary factors may cause such crossing. But in the main, the general type of curve can be controlled.

Therefore, it will be seen that the same general construction may be employed for quite a number of different vehicles, all requiring different clutch actions and deflection curves. By merely selecting the desired shape of the head a proper clutch action may be obtained for any one of these vehicles. The same equipment may be used for making all these clutch discs, except for the forming dies which impart the different off-set shapes to the spoke heads. It may further be said that a form such as shown in Fig. 13 has a low deflection rate and gives a soft action at the low end of the engagement curve, but the rate progressively increases with the form shown from Figs. 14 to 18 inclusive. It will be noted that the rivet locations in the different forms may be all in the same general location. In Figs. 14 to 18, inclusive, the rivets are located at the high points of the off-set structure.

It will therefore be seen that the invention provides a cushion clutch member which, by combining a torsion action and a bending action, obtains a desired deflection curve and at the same time this is accomplished without the use of separate spring inserts. In fact, a minimum number of parts are required, namely, the disc itself and two facings. Of course, the invention can be used without the vibration dampening hub construction, in which event the disc 2 may be fastened directly to the hub 1. If a torsion action alone is employed the resistance to total deflection is not adequate where the disc 2 is made of the desired stock; in other words, if torsion alone is employed the disc 2 will have to be made of heavier, stronger stock. Thus the invention not only provides a structure wherein a desired nicety of deflection is obtained, but at the same stroke provides a clutch member essentially simple in construction and composed of a minimum number of parts.

The beam arrangement in the forms shown in Figs. 13 to 18, inclusive, varies from the beam arrangement as illustrated in Fig. 1. In Fig. 17, for example, it may be considered that one beam extends from the end 82a to the point of attachment of the lower facing and that another beam extends from the end 83a to the point of attachment of the upper facing. Both, however, engage the facings and hold them yieldingly spaced apart by resistance to bending. Thus it will be seen that it may be said that the beams overlap in that the central portion 81 is common to both beams. In this situation the total length of the two beams may exceed the total circumferential dimensions of the cushion member.

In the claims appended hereto directed to this sort of structure, language is used which says that the ends of the beams are arranged to support the facings. This in intended to cover the structure where the ends are initially in contact with the facings and also where the ends come into contact with the facings only after some compression.

I claim:

1. A clutch driven member comprising, a hub, a disc secured thereto, said disc having its outer zone comprised of free ended T-shaped spokes, the vertical portion of each spoke being twistable and disposed at an angle to the center plane of the disc, the end parts of the cross bar being connected to the center portion substantially on bend lines and disposed out of the center plane of the disc and on opposite sides thereof, said end portions constituting lands, friction facing rings on opposite sides of the spokes, means securing one facing ring to the lands located on the same side of the center plane of the disc, means securing the other facing ring to the lands located on that side of the center plane of the disc.

2. A clutch driven member comprising, a hub, a disc secured thereto, said disc having its outer zone comprised of free ended T-shaped spokes, the vertical portion of each spoke being twistable and disposed at an angle to the center plane of the disc, the end parts of the cross bar being connected to the center portion substantially on bend lines and disposed out of the center plane of the disc and on opposite sides thereof, said end portions constituting lands and lying in planes substantially parallel to the plane of the disc, friction facing rings on opposite sides of the spokes, means securing one facing ring to the lands located on the same side of the center plane of the disc, means securing the other facing ring to the lands located on that side of the center plane of the disc.

3. A clutch member comprising, a disc having spokes in its outer zone with circumferentially enlarged heads and free ends and with neck portions connecting the heads to the disc body, the neck portions being twistable and angularly disposed with respect to the plane of the disc so that part of the head of each spoke is disposed out of the center plane of the disc, a facing secured to each side of the disc with at least one facing making contact with parts of the spoke heads which are the furthest removed from the center plane of the disc whereby the facings are normally spaced apart, said heads having extending portions which connect to the angular portions and which project circumferentially beyond the point of contact with the facing whereby compression of the facings toward each other is resisted first by a torsion action which twists the neck portions of the spokes and subsequently by torsion and bending actions, said extending portions adapted to be formed to terminate in a desired plane between the inner surfaces of the two facings whereby to regulate the amount of compression resisted by torsion alone and the amount of compression resisted by torsion and bending.

4. A clutch member comprising, a disc having T-shaped spokes in its outer zone with the stem of the T constituting a neck portion and the cross bar of the T constituting an enlarged head portion, the neck and center portion of the cross bar being angularly disposed with respect to the plane of the disc whereby opposite parts of the cross bar of the T lie on opposite sides of the center plane of the disc, said neck portions being twistable, a facing on each side of the disc and each secured to parts of the cross bar of the T furthest removed from the center plane of the disc so that the facings are normally spaced apart and whereby compression is resisted by torsion action which twists the neck portions and bending actions, the end portions of the cross bar of the T which project beyond the points of contact with the facings adapted to be formed to terminate in any desired plane between the spaced facings to regulate the torsion and bending actions.

5. A clutch member comprising, a disc having spokes in its outer zone with circumferentially enlarged head portions, the intermediate portion of the enlarged heads being angularly disposed to provide parts which are spaced axially from the center plane of the disc, a facing on each side of the disc and making contact with said parts, each enlarged head having opposite end portions projecting from said parts, each projecting end portion extending from its associated part across the center plane of the disc and normally beyond the plane of the said part associated with the opposite projecting end portion, and means securing the facings to said parts whereby to flex the spoke heads and preload the same, said facings adapted to be compressed toward each other against the resistance of torsion and bending actions.

6. A clutch member comprising a disc having spokes in its outer zone with the spokes having enlarged heads, the intermediate portions of the spokes being angularly disposed with respect to the plane of the disc and the end portions of the enlarged heads projecting from the intermediate angular portion, a facing on each side of the disc each making contact with portions of the heads which are furthest removed from the plane of the disc, means securing one facing to the outer and inner portions of a spoke and on one side of a center line through the spoke, means securing the other facing to the outer and inner portions of the spoke head on the opposite side of the center line through the spoke, said means for securing each facing to the inner and outer portions of the spoke head being substantially the same distance from the center line through the spoke.

7. A clutch member comprising a disc having spokes in its outer zone with the spokes having enlarged heads, the intermediate portions of the spokes being angularly disposed with respect to the plane of the disc and the end portions of the enlarged heads projecting from the intermediate angular portion, a facing on each side of the disc each making contact with portions of the heads which are furthest removed from the plane of the disc, radially inward and outward rivets for securing one facing to each spoke on one side of a center line through the spoke, similar rivets for securing the other facing to each spoke head on the opposite side of the center line, the radially inward and outward rivets connecting each facing being substantially equidistant from the center line through the spoke.

8. A clutch member comprising a disc having spokes in its outer zone with the spokes having enlarged heads and free ends, the intermediate portions of the spokes being twistable and angularly disposed with respect to the plane of the disc and the end portions of the enlarged heads projecting from the intermediate angular portion, a facing on each side of the disc each making contact with portions of the heads which are furthest removed from the plane of the disc, means for securing one facing to each spoke on one side of a center line through the spoke, means for securing the other facing to each spoke head on the opposite side of the center line, the dimensions of the head of each spoke on substantially chordal lines drawn through the head adjacent the inner and outer peripheries thereof being approximately the same.

9. A clutch member comprising a disc having spokes in its outer zone with the spokes having enlarged heads and free ends, the intermediate portions of the spokes being twistable and angularly disposed with respect to the plane of the disc and the end portions of the enlarged heads projecting from the intermediate angular portion and joined thereto on bend lines, a facing on each side of the disc each making contact with portions of the heads which are furthest removed from the plane of the disc, means for securing one facing to each spoke on one side of a center line through the spoke, means for securing the other facing to each spoke head on the opposite side of the center line, the dimensions of the head of each spoke on substantially chordal lines drawn through the head adjacent the inner and outer peripheries thereof being approximately the same, and the two bend lines of each head being substantially parallel and equidistant from a center line drawn through a spoke.

10. A clutch member comprising a disc having spokes in its outer zone and the spokes having enlarged heads, a facing on each side of the disc overlying the heads and secured to the disc, and the radial dimensions of the heads being substantially that of the radial dimensions of the facings, each spoke having an intermediate portion disposed angularly with respect to the plane of the disc so that portions of the heads lie axially removed from the center plane of the disc for contact with opposite facings to resiliently space the facings from each other, opposite portions of each spoke head being angularly disposed relative to the plane of the disc so as to extend in a direction angularly transverse of the space between the facings, the tip ends of each spoke head lying substantially in the plane of the disc and joining with the said opposite portions substantially on bend lines, the said bend lines being substantially parallel to each other and substantially equidistant from a center line through the spoke.

11. A clutch member adapted to be packed between other clutch members comprising, a disc-like body having T-shaped spokes in its outer zone, said spokes characterized by the vertical part of the T being twistable and the cross bar of the T forming free outer ends of the spokes and constituting enlarged heads, a facing on each side of the enlarged heads; the enlarged heads being pre-formed into a shape so that they are axially yieldable and so that each head has an intermediate portion in substantial alignment with the vertical part of the T, a land on each side of the intermediate portion and outer portions projecting beyond the lands, said lands being spaced axially relative to each other; means securing the facings to the respective lands so that the facings are yieldably spaced, the projecting outer portions adapted to have their edges disposed in a desired plane between the two facings whereby, upon compression incident to packing pressure, the pre-formed heads are flexed and each head presents two areas of support for each facing, the areas of support for each facing residing in one of the lands and the edge of the projecting portion remote therefrom, the radial dimension of the enlarged heads extending substantially across the width of the facings.

ERNEST E. WEMP.